United States Patent [19]

Field

[11] Patent Number: 5,786,976
[45] Date of Patent: Jul. 28, 1998

[54] COUPLING WITH HARD METALLIC DUCTILE CONDUCTIVE COATING

[75] Inventor: Stanley R. Field, Garden Grove, Calif.

[73] Assignee: Hydraflow, Cerritos, Calif.

[21] Appl. No.: 680,958

[22] Filed: Jul. 16, 1996

[51] Int. Cl.[6] ................................ H01R 4/64
[52] U.S. Cl. .................................... 361/215
[58] Field of Search ............... 361/215; 439/100, 439/101, 191, 192, 320, 321; 174/84 R

[56] References Cited

U.S. PATENT DOCUMENTS

| | | |
|---|---|---|
| 3,383,637 | 5/1968 | De Lano . |
| 3,402,947 | 9/1968 | Lewis . |
| 3,462,727 | 8/1969 | Blight et al. . |
| 3,669,472 | 6/1972 | Nadsady . |
| 3,805,379 | 4/1974 | Vetter . |
| 3,808,580 | 4/1974 | Johnson . |
| 3,917,373 | 11/1975 | Peterson . |
| 3,943,273 | 3/1976 | De Putter .................. 174/84 |
| 3,971,614 | 7/1976 | Paoli et al. . |
| 4,019,762 | 4/1977 | Eidelberg et al. . |
| 4,030,798 | 6/1977 | Paoli . |
| 4,035,045 | 7/1977 | Trevithick . |
| 4,074,927 | 2/1978 | Ball . |
| 4,109,097 | 8/1978 | Berry . |
| 4,117,287 | 9/1978 | Walker et al. . |
| 4,165,910 | 8/1979 | Anderson . |
| 4,241,969 | 12/1980 | D'Amato et al. . |
| 4,249,786 | 2/1981 | Mahoff . |
| 4,260,211 | 4/1981 | Mollere . |
| 4,268,103 | 5/1981 | Schildkraut et al. . |
| 4,286,834 | 9/1981 | Goodman et al. . |
| 4,322,451 | 3/1982 | Emerson et al. . |
| 4,332,404 | 6/1982 | Huffman . |
| 4,346,428 | 8/1982 | Gale . |
| 4,359,254 | 11/1982 | Gallusser et al. . |
| 4,361,373 | 11/1982 | Gallusser et al. . |
| 4,405,969 | 9/1983 | Swavely . |
| 4,435,760 | 3/1984 | Kuno et al. . |
| 4,443,052 | 4/1984 | Eaby et al. . |
| 4,461,526 | 7/1984 | Galluser et al. . |
| 4,462,653 | 7/1984 | Flederbach et al. . |
| 4,472,013 | 9/1984 | Frear . |
| 4,487,462 | 12/1984 | Gale et al. . |
| 4,506,942 | 3/1985 | Flederbach et al. . |
| 4,525,017 | 6/1985 | Schildkraut et al. . |
| 4,542,952 | 9/1985 | Tomsa . |
| 4,544,224 | 10/1985 | Goodman et al. . |
| 4,591,226 | 5/1986 | Hargett et al. . |
| 4,597,621 | 7/1986 | Burns . |
| 4,603,934 | 8/1986 | Burns . |
| 4,613,192 | 9/1986 | Peterson . |
| 4,614,461 | 9/1986 | Taniguchi et al. ............ 405/211 |
| 4,616,894 | 10/1986 | Baker . |

(List continued on next page.)

OTHER PUBLICATIONS

Engineering Bulletin—"Boron Electroless Nickel vs. Hard Chrome", Anodyne™, Inc., May 1992.

*Primary Examiner*—Fritz Fleming
*Attorney, Agent, or Firm*—David M. Klein; Shearman & Sterling

[57] ABSTRACT

A coupling for preventing the buildup of static electricity between adjacent conduits includes first and second threadably engageable coupling members in electrical contact with the adjacent conduits. The threads are coated with a hard metallic ductile conductive coating which is preferably a boron-nickel coating, to provide electrical conductivity between the coupling members. The coating has a relatively low co-efficient of friction so as to prevent binding of the threads during threading. In one embodiment, a detent spring, which includes one or more resilient detents, is rotatable with one coupling member and engages with a notch or notches on the other coupling member to provide a frictional force against relative rotation between the coupling members as the coupling members threadably engage. The coupling members may be entirely coated with the boron-nickel coating, or selectively coated to provide the required electrical conductivity between the coupling members. A bonding wire in electrical contact with each coupling member makes redundant electrical contact with the conduits.

16 Claims, 4 Drawing Sheets

U.S. PATENT DOCUMENTS

| | | | |
|---|---|---|---|
| 4,629,272 | 12/1986 | Mattingly et al. | |
| 4,633,363 | 12/1986 | Bordner. | |
| 4,639,064 | 1/1987 | Knapp et al. | |
| 4,648,670 | 3/1987 | Punako et al. | |
| 4,658,326 | 4/1987 | Clark et al. | 361/215 |
| 4,690,212 | 9/1987 | Termohlen. | |
| 4,697,608 | 10/1987 | Kolze et al. | |
| 4,703,988 | 11/1987 | Raux et al. | 439/321 |
| 4,726,782 | 2/1988 | Hager et al. | 439/321 |
| 4,741,706 | 5/1988 | Takeda et al. | 439/318 |
| 4,808,117 | 2/1989 | Gale et al. | 439/192 |
| 4,820,185 | 4/1989 | Moulin | 439/321 |
| 4,863,328 | 9/1989 | Malek. | |
| 4,900,260 | 2/1990 | Drogo | 439/321 |
| 4,902,238 | 2/1990 | Iacobucci | 439/135 |
| 4,913,657 | 4/1990 | Naito et al. | 439/192 |
| 4,928,202 | 5/1990 | Gale et al. | 361/215 |
| 5,022,864 | 6/1991 | Ali | 439/192 |
| 5,035,640 | 7/1991 | Drogo | 439/321 |
| 5,046,964 | 9/1991 | Welsh et al. | 439/271 |
| 5,082,454 | 1/1992 | Tonkiss et al. | 439/320 |
| 5,083,930 | 1/1992 | Barron | 439/101 |
| 5,145,394 | 9/1992 | Hager | 439/321 |
| 5,166,475 | 11/1992 | Ackerman et al. | |
| 5,181,860 | 1/1993 | Homma et al. | 439/321 |
| 5,192,219 | 3/1993 | Fowler et al. | 439/321 |
| 5,222,770 | 6/1993 | Helevirta | 439/191 |
| 5,225,632 | 7/1993 | Gorin et al. | |
| 5,246,379 | 9/1993 | Wright | 439/321 |
| 5,295,848 | 3/1994 | Mohn | 439/247 |
| 5,322,451 | 6/1994 | Guss, III et al. | 439/321 |
| 5,328,387 | 7/1994 | Hoffman | 439/469 |
| 5,334,801 | 8/1994 | Mohn. | |
| 5,366,383 | 11/1994 | Dearman | 439/321 |
| 5,382,359 | 1/1995 | Brandt. | |
| 5,399,096 | 3/1995 | Quillet et al. | 439/321 |
| 5,430,603 | 7/1995 | Albino et al. | 361/215 |
| 5,435,760 | 7/1995 | Miklos | 439/321 |
| 5,447,447 | 9/1995 | Guss, III et al. | 439/321 |
| 5,480,311 | 1/1996 | Luu | 439/100 |
| 5,483,412 | 1/1996 | Albino et al. | 361/215 |
| 5,490,789 | 2/1996 | Simons | 439/101 |
| 5,496,189 | 3/1996 | Over et al. | 439/321 |
| 5,505,632 | 4/1996 | Hayashi et al. | 439/318 |
| 5,522,770 | 6/1996 | Sugiki et al. | |
| 5,563,374 | 10/1996 | Hubert | 174/84 R |

COUPLING WITH HARD METALLIC DUCTILE CONDUCTIVE COATING

BACKGROUND OF THE INVENTION

1. Field of the Invention.

The present invention relates generally to a coupling assembly for fuel lines and the like, and more particularly to a coupling assembly for interconnecting adjacent conduits in which the coupling assembly includes threadably interconnected male and female coupling members are coated with a hard metallic ductile conductive coating for preventing the buildup of an electrostatic charge between the conduits.

2. Description of the Related Art.

When conveying fluid, such as jet fuel, between interconnected fuel lines, it is necessary to provide electrical conductivity between the fuel lines to prevent the buildup of an electrostatic charge between the fuel lines. If an electrostatic charge were to build up, an electric spark could occur, thereby causing the fuel to ignite. The build up of static electricity poses a problem in other applications which use conduits for material transfer. For example, in sandblasters, if the hose used to discharge the sand is not grounded, static electricity may build up sufficiently in the hose so that an electric shock and/or arcing may occur at the coupling between hose lengths, causing personal injury or property damage. This situation is discussed in more detail in U.S. Pat. No. 4,658,326.

In order to overcome the problem of static buildup in fuel lines, U.S. Pat. No. 4,487,462, the contents of which are incorporated herein by reference, discloses a coupling that provides electrical contact between adjacent fuel lines. A pair of bonding jumpers is provided each of which includes i) an annular ring having a plurality of bonding jumper contact flanges that engage a surface of the threaded coupling, and ii) a plurality of spaced retaining tangs which snap into a retaining groove in the coupler and the nut. The nut also includes a plurality of circumferentially spaced contact tangs which are interspersed with the retaining tangs and which contact the outer end of the coupling beyond the threads.

Another requirement for aircraft fuel lines, which is not necessarily a requirement for couplings used in other applications, is that the coupling be self-retained after installation in such a manner that the coupling will not loosen despite vibrations or other forces to which the coupling may be subjected. U.S. Pat. No. 3,669,472, the contents of which are incorporated herein by reference, discloses one of many patented devices that have been developed to prevent relative rotation of coupling members. This device relates to a coupling having an annular ring with spring fingers which releasably engage notches on the edge of a male connector to minimize the chance of the coupling becoming unthreaded due to vibrations or other forces on the coupling. A separate releasable bonding ring is provided between the two coupling elements.

A related aspect of the coupling of fuel lines to reduce the buildup of static electricity is the contact between the coupling members and the fuel lines. This point of contact is preferably redundant so as to reduce the likelihood that the contact will fail, and must be capable of being rotated with the coupling members as they are threaded together. One method for providing such contact was developed by the Assignee of the present invention and sold as the 15J02 coupling. The 15J02 coupling is constructed of male and female threaded coupling members and a detent ring with a single resilient detent mounted to one of the coupling members. The other coupling member includes a surface facing the detent ring with spaced notches for engaging with the detent as the coupling members are rotated relative to each other. In order to provide electrical contact between the coupling members and the fuel lines, a split ring with a multi-sided bonding wire mounted therein is mounted in each coupling member. The bonding wires provide multiple electrical contact points between the fuel lines and coupling members.

Figure 1:
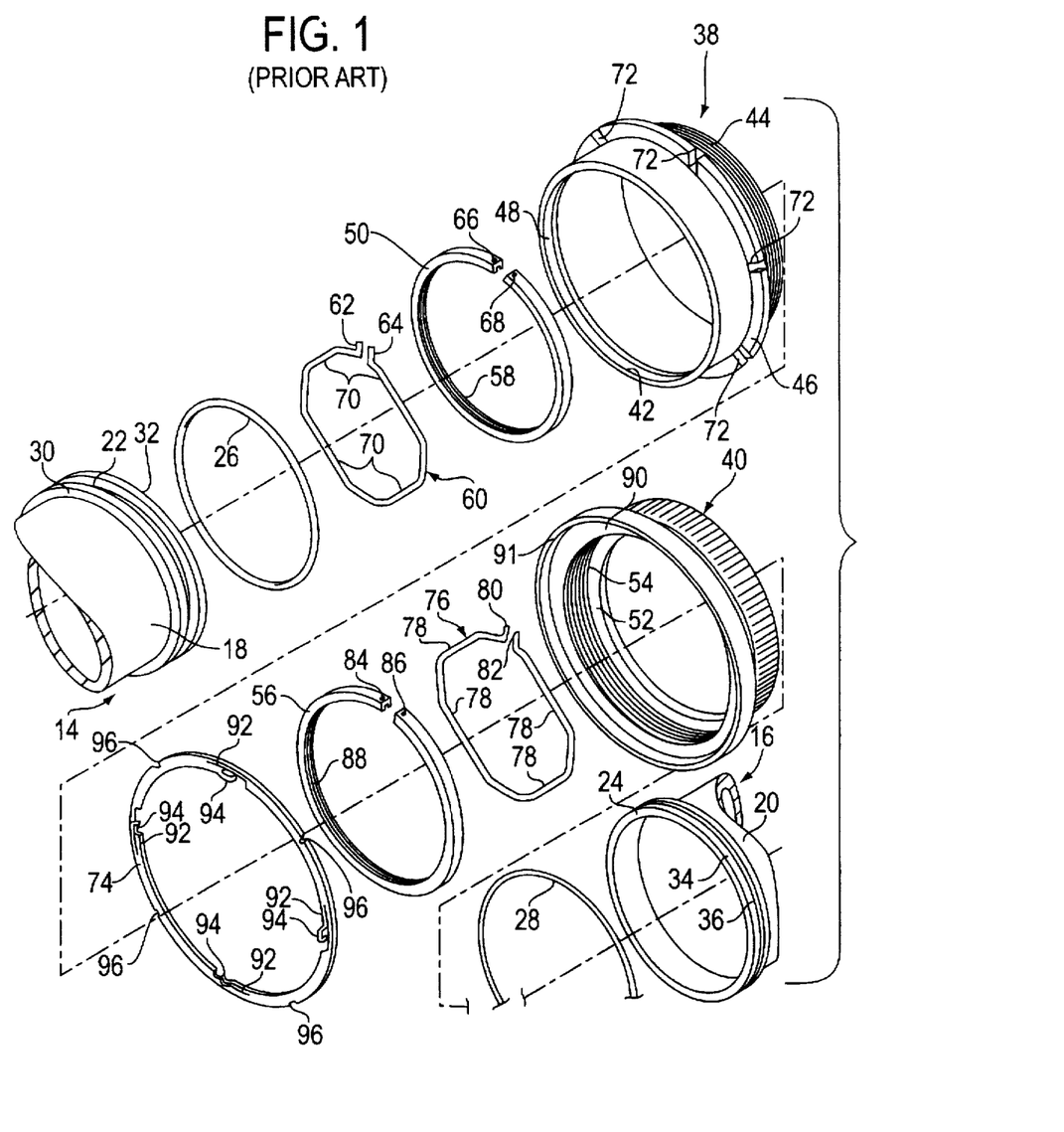
FIG. 1 is an exploded perspective view of a prior art fuel coupling of the type disclosed in U.S. Pat. Nos. 4,808,117 and 4,928,202.

As shown in FIG. 1, U.S. Pat. Nos. 4,808,117 and 4,928,202, the contents of which are incorporated herein by reference, relate to a threaded coupling that is essentially a combination of the teachings of the aforementioned U.S. Pat. Nos. 3,669,472 and 4,487,462, and the 15J02 coupling. A pair of assembly sealing flanges 14 and 16 are connected to the ends of fuel lines (not shown). The flanges each have a cylindrical skirt 18 and 20 which is sealingly attached to the fuel lines by any suitable means. Each flange is provided with a peripheral recess 22 and 24 for receiving 0-rings 26 and 28. Recess 22 is formed between a pair of peripheral ribs 30 and 32 and recess 24 is formed between a pair of similar ribs 34 and 36. The confronting ends of the fuel lines are interconnected by means of a threaded coupler 38 and nut 40 which cooperate to draw the coupler and nut axially toward each other to secure them together and to form a fluid-tight seal. Within coupler 38 is a circumferential retaining groove 48 receiving a split ring 50.

The nut or female member 40 has an inwardly projecting peripheral flange 52 on its end and internal threads 54 which receive threads 44 of coupler 38. The peripheral flange 52 serves as a stop for split ring 56, which is mounted in female coupling member 40. Split rings 50 and 56 have internal grooves 58 and 88 within which bonding rings 60 and 76 are received respectively. Bonding rings 60 and 76 have a generally non-circular configuration and have upturned spaced ears 62, 64, 80 and 82 which are squeezed together to insert the bonding rings into grooves 58 and 88, and which project upwardly through apertures 66, 68, 84 and 86. Split rings 50 and 56 serve to retain the coupling members 38 and 40 on sealing flanges 14 and 16. The flat sides 70 and 78 of bonding rings 60 and 76 engage the cylindrical skirts 18 and 20 of sealing flange 12 and 14 to provide multiple electrical contact points between the coupling members 38 and 40 and the sealing flanges. Flange 48 has a plurality of spaced notches 72 which are utilized with a bonding jumper 74.

Nut 40 is provided with a recess 90 within which bonding jumper 74 is received. The bonding jumper has a plurality of equally spaced spring detents 92, each of which has a curved end 94. The bonding jumper is also provided with spaced notches 96 into which the edge 91 is bent to form a crimp to prevent relative rotation of bonding jumper 74 with respect to nut 40. As nut 40 is tightened, the curved ends of spring detents 92 come into engagement with flange 46 of coupler 38 and engage notches 72. As the nut is drawn tight, the force of each spring detent against flange 46 and notches 72 increases. This arrangement provides a redundant electrical contact between nut 40 and coupling 38. Bonding jumper 74 also serves to minimize the possibility that the nut will turn in a reverse direction accidentally due to vibrations or other forces.

In commercial versions of couplings of the type disclosed in U.S. Pat. Nos. 4,808,117 and 4,928,202, the threads of the coupling members are coated with a non-electrically-conducting dry-lube coating in order to enable the members to be threadably engaged without binding. Thus, the redundant electrical contact provided by bonding jumper 74 is necessary because no electrical contact is provided between the coupling members through the threads.

Accordingly, it would be desirable to have a coupling for preventing electrostatic build up between adjacent conduits in which the electrical contact is provided through the threads so that a bonding jumper is not required for preventing such electrostatic buildup. It would also be desirable to have such a coupling in which there is a low coefficient of friction between the threaded surfaces so as to avoid binding of the threads during threading.

SUMMARY OF THE INVENTION

The present invention is a coupling for preventing the buildup of static electricity between first and second conduits. The coupling comprises first and second coupling members in electrical contact with the first and second conduits respectively. The first and second coupling members each comprise threads and are threadably engageable. The threads are coated with a hard metallic ductile conductive coating, which is corrosion resistant, has a low coefficient of friction and provides electrical conductivity between the coupling members. A preferred hard metallic ductile conductive coating is boron-nickel. The boron-nickel coating has a satisfactory low coefficient of friction so as to prevent binding of the threads during threading.

In a preferred embodiment, the first coupling member has a first surface, which includes at least one detent notch, facing the second coupling member. A detent spring is rotatable with the second coupling member and faces the first surface. The detent spring includes a detent which engages with the notch to provide a resistance force against relative rotation between the first and second coupling members as the coupling members threadably engage. The detent spring may be metallic or non-metallic, or coated with a dry-lube or other lubricant. If desired, the first and second coupling members may be entirely coated with the boron-nickel coating, or selectively coated to provide the required electrical conductivity between the coupling members.

In order to provide electrical contact between the coupling members and the conduits, the coupling members are provided with inwardly facing circumferential retaining grooves. In one embodiment of the invention, split rings are mounted in the retaining grooves, with each split ring being in electrical contact with its respective coupling member. Each split ring has an internal groove, with bonding wires mounted within the internal grooves. Each bonding wire is in electrical contact with its respective coupling member and with its respective conduit. The bonding wires are preferably multi-sided and make multiple electrical contacts with the conduits.

In an alternative embodiment, the bonding wires are mounted directly in the coupling members, with each bonding wire in electrical contact with its respective coupling member and with its respective conduit. Similarly, the bonding wires are preferably multi-sided and make multiple electrical contacts with the conduits.

In a more general embodiment, the invention relates to a coupling in which the first and second coupling members are attachable in physical contact for establishing a passage conduit between the conduits. At least a portion of the areas of the coupling members that are in physical contact are coated with a boron-nickel coating for establishing electrical contact between the coupling members.

DETAILED DESCRIPTION OF THE INVENTION

As shown in FIGS. 2–5, the present invention is an improved threaded coupling 100 for interconnecting the ends of adjacent conduits (not shown). The conduits may be any appropriate pipes, tubes or other conduits for carrying a fluid, such as fuel, or for carrying any other material, such as sand for a sandblaster. It will be appreciated that a function of coupling 100 is to provide electrical conductivity between the adjacent conduits. This is important for preventing electrical arcing or sparks caused by static electricity, lightning strikes or fault currents. The conduits may be constructed entirely of an electrically conducting material, or may include only a shielding or grounding layer constructed of an electrically conducting material. In general, the conduits must be at least partially constructed of an electrically conducting material that is in electrical communication with coupling 100.

An assembly sealing flange 114 is sealingly attached to the end of each conduit by any method known to those skilled in the art provided that each flange 114 is in electrical communication with the electrically conductive portion of its associated conduit. Each flange 114 is provided with a peripheral recess 122 formed between a pair of peripheral ribs 130. An O-ring 126 is seated in each peripheral recess 122 for forming a fluid tight seal between flange 114 and coupling 100 as shown in detail in FIG. 5.

Figure 4:
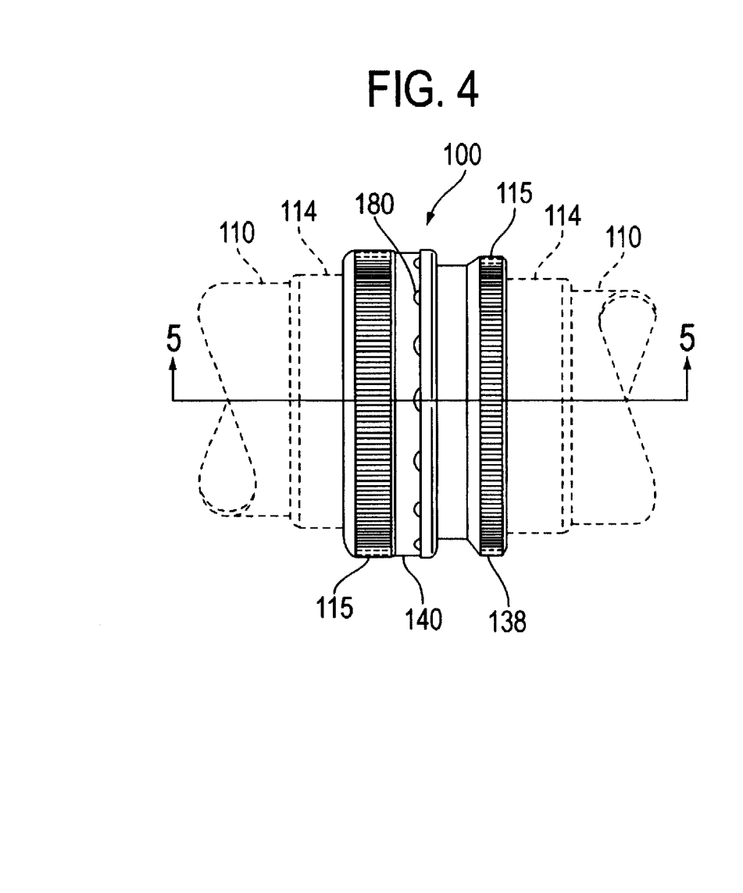
FIG. 4 is a side view of the coupling of the invention.
Figure 5:
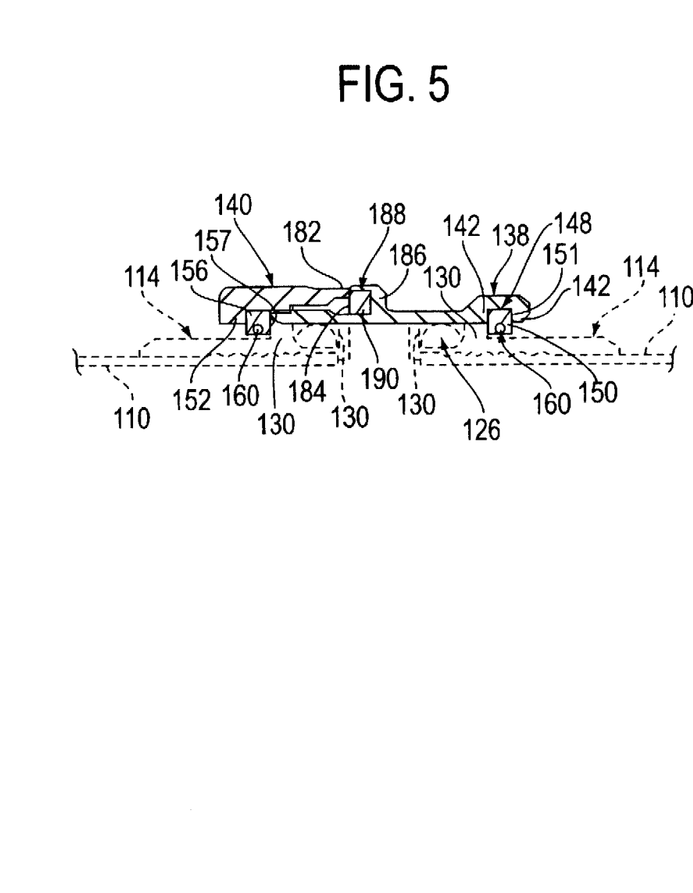
FIG. 5 is a cross-sectional view of the coupling of the invention through Section 5—5 for the embodiment of the invention shown in FIG. 3.

Coupler 100 consists of male and female coupling members 138 and 140 respectively which are threadably interconnected by means of external threads 112 on male coupler 138 and internal threads 113 on female coupler 140. Coupling members 138 and 140 are preferably constructed of aluminum, stainless steel, or titanium, but may be constructed of any other appropriate material, if desired. Grips 115 are machined on the outer surface of the male and female coupling members to facilitate rotation of the coupling members. As male coupling member 138 is rotated with respect to female coupling member 140 with threads 112 and 113 in engagement, the coupling members are drawn axially toward each other until a fully threaded position is achieved (FIGS. 4 and 5). Each of the coupling members 138 and 140 is generally cylindrical in shape and is slidable over its respective sealing flange 114.

FIGS. 3–5 and FIG. 2 show first and second embodiments of the invention respectively with respect to the structure for securing coupling 100 to flanges 114 with the required electrical contact therebetween. Beginning with the first embodiment, a shown in FIGS. 3 and 5, male coupler 138 is provided with inwardly projecting flanges 142 which define a circumferential retaining groove 148. Seated within retaining groove 148 is a split ring 150 which includes a circumferential groove 151. As shown in FIG. 5, female coupling member 140 has an inwardly projecting peripheral flange 152 which serves as a stop for split ring 156. Split ring 156 is seated against the face of flange 152 and includes a circumferential groove 157. Each split ring is preferably constructed of aluminum or any other appropriate electrically conducting material.

Figure 3:
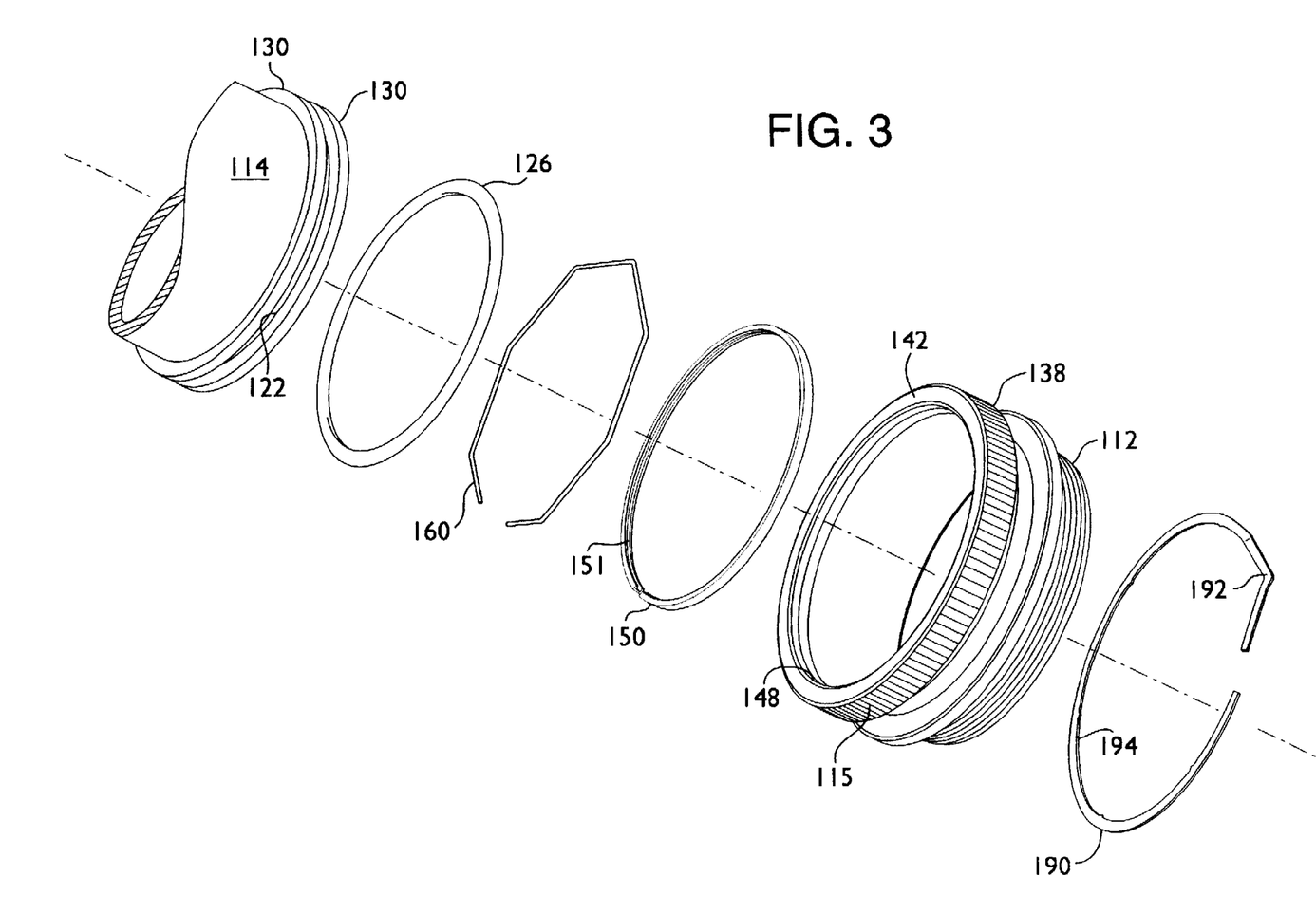
FIG. 3 is an exploded perspective view of the fuel coupling of the invention with the bonding wires mounted in split rings.

Mounted within each circumferential groove 151 and 157 of split rings 150 and 156 is a metallic bonding ring 160. Each bonding ring 160 preferably has a multi-sided octagonal shape and serves to retain the coupling members 138 and 140 on flanges 114. The straight sides of bonding rings 160 engage the outer surfaces of sealing flanges 114 to provide multiple electrical contacts between the coupling 100 and flanges 114. It is foreseen that bonding rings with other shapes, e.g., with fewer or more sides, would provide the requisite electrical contact between coupling 100 and flanges 114. Bonding rings 160 are preferably constructed of tin-coated beryllium copper or any other appropriate electrically conducting material.

Figure 2:
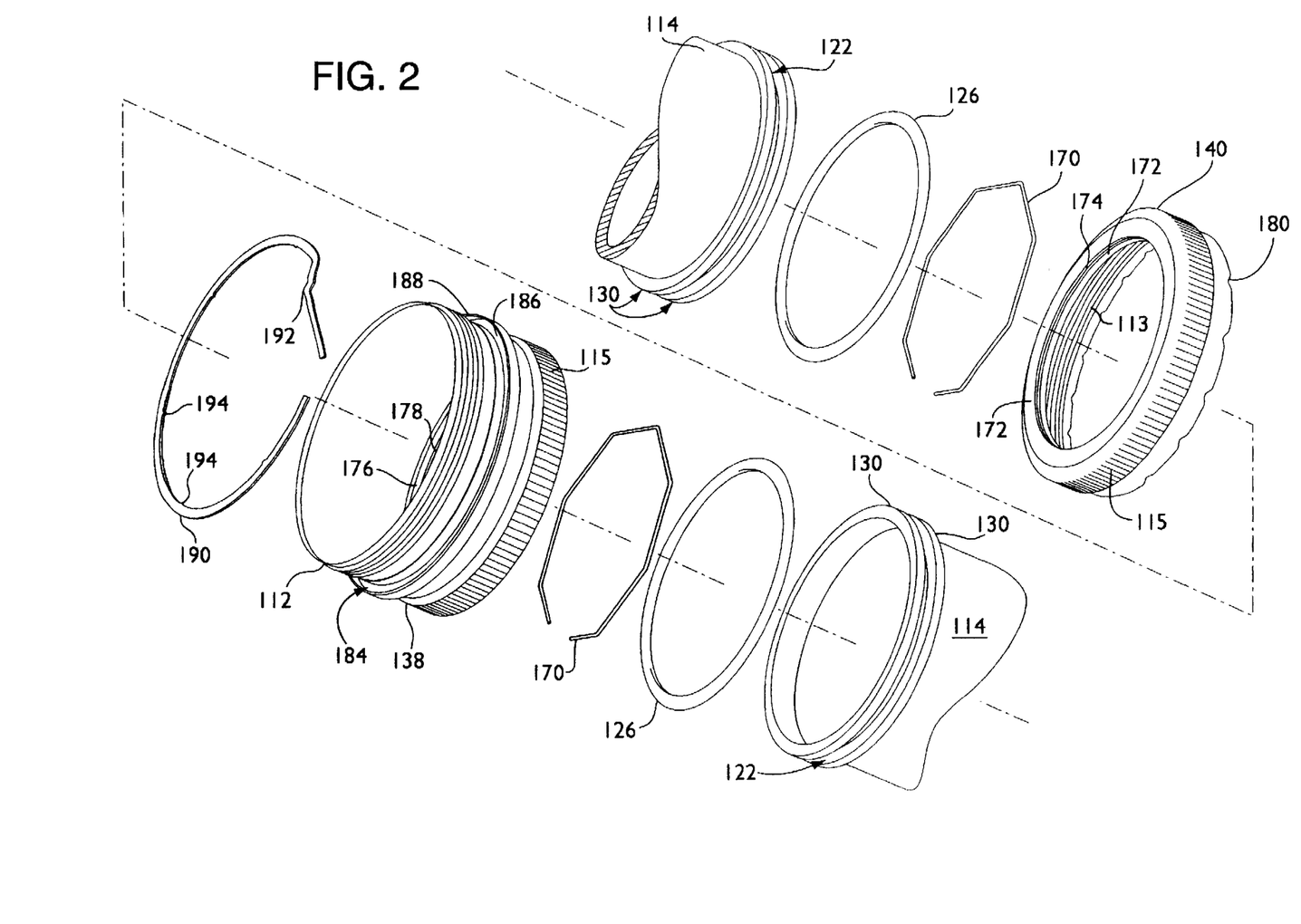
FIG. 2 is an exploded perspective view of the fuel coupling of the invention with the bonding wires mounted directly in grooves on the coupling members.

As shown in FIG. 2, the second embodiment for securing coupling 100 to flanges 114 is similar to the first embodiment except that split rings 150 and 156 are not used to secure the bonding rings. Instead, female coupling 140 is provided with inwardly projecting flanges 172 which define a circumferential groove 174. Seated within groove 174 is a metallic bonding ring 170 which has an octagonal shape that serves to retain the coupling member 140 on and in electrical communication with flange 114. As in the first embodiment, male coupler 138 is provided with inwardly projecting flanges 176 which define a circumferential groove 178 in which a metallic bonding ring 170 is mounted. Thus, with respect to male coupler 138, the principal difference between the first and second embodiments of the invention is that the inwardly projecting flange has a smaller inside diameter such that it performs a similar retaining function as the split ring. In the first embodiment, retaining groove 148 is sized to receive split ring 150, whereas in the second embodiment, groove 178 is sized to receive only the narrower bonding wire 170.

Female coupler 140 has a plurality of spaced detent notches 180 formed in a circumferential lip 182. An annular groove 184 is formed on male coupler 138 by outwardly extending flange 186 and circumferential lip 188. Mounted within groove 184 is a detent spring 190. Detent spring 190 has a detent 192 which is formed on a curved end thereof and inwardly extending ears 194. Annular groove 184 is preferably sized such that detent spring 190 must be force pressed therein. When detent spring 190 is pressed into groove 184, ears 194 frictionally engage with male coupling 138 to prevent relative rotation of detent spring 190 with respect to male coupling 138. Those skilled in the art will appreciate that other techniques exist to prevent relative rotation of detent spring 190 with respect to male coupling 138.

As male coupling 138 is tightened, i.e., rotated with respect to female coupling 140, detent 192 will come into engagement with circumferential lip 182 in female coupling 140 and with detent notches 180. As the male and female couplings are drawn tighter, the force of spring detent 192 against detent notches 180 will increase. This arrangement provides a locking mechanism which minimizes the likelihood that the male coupling will accidentally turn in a reverse direction due to vibrations or other forces. The coupling may be disassembled by turning male coupling 138 counterclockwise with sufficient force to overcome the engagement of detent 192 with detent notches 180.

Detent ring 190 is preferably constructed of a metal, such as stainless steel or beryllium copper, or of any other appropriate material with sufficient resiliency and strength to perform the functions described herein. As discussed in detail below, unlike in prior art devices, the detent spring is not required to provide an electrical path between the male and female coupling members. Accordingly, a non-metallic detent spring may be used, if desired. In a preferred embodiment, detent spring 190 is coated with a dry-lube coating of the type defined in Military Specification MIL-L-46010 Type 1. It will be appreciated that the lubricant or anti-wear coating is optional and that other types of lubricants or anti-wear coatings may be used in lieu of the dry-lube. Also, the detent spring may be eliminated if the prevention of unthreading of the coupling members is not critical or if an alternative approach is used to prevent such unthreading.

In order to ensure electrical continuity between male and female coupling members 138 and 140, threads 112 and 113 are coated with a boron electroless nickel ("boron nickel") coating. The boron nickel coating also provides a relatively low co-efficient of friction between the male and female coupling members, thereby preventing binding of threads 112 and 113 during mating of the coupling members and also obviating the need for a dry-lube coating on the threads. Without the dry-lube coating, strong electrical contact is provided between the threads of the male and female coupling members. Thus, with the coupling of the invention (in the embodiment shown in FIG. 2), an electrical path is provided from flange 114, through bonding wire 170 to female coupling member 140, from threads 113 to threads 112 and male coupling member 138, and through bonding wire 170 to flange 114. A similar electrical path is provided in the embodiment shown in FIGS. 3–5, with the additional path through the split rings. No electrical path is required through detent spring 190, thereby enabling detent spring 190 to be dry-lube coated or constructed of a non-metallic material. In a preferred embodiment, the boron nickel is coated to a thickness of 0.0003"+/−0.0001". It is foreseen that the thickness of the boron nickel coating may vary as desired, provided that the dimensions of the coupling are such to allow the male and female coupling members to be threadably engaged. Furthermore, it will be appreciated that while it is only necessary that the threads of the coupling members be coated with the boron nickel coating, it is foreseen that any other portion of the coupling members, or the entirety of the coupling members may be coated with the boron nickel coating.

Boron nickel coating is known to those skilled in the coating field and is defined in AMS 2433-A. Such coating is commercially available by Anodyne™, Inc., 2230 S. Susan Street, Santa Ana, Calif. 92704. The characteristics of boron nickel coatings are described in "Engineering Bulletin— Boron Electroless Nickel vs. Hard Chrome", Anodyne™, Inc., May 1992, the content of which is incorporated herein by reference. In general, boron nickel is a metallic coating consisting of uniformly deposited hard nodules interlaced in a soft matrix. Both the nodules and matrix are metallic, although the composition of each is different. The nodules lend hardness to the coating and provide low friction and ductility to the surface of the coating. The matrix "fills in" between the nodules and is ductile.

The boron nickel coating is applied through an electroless immersion process in which the parts to be coated are submerged in an alkaline bath that operates at approximately 195° F. at about 12 pH. A chemical reaction causes a continuous uniform coating to be deposited on all unmasked areas of the parts. The parts can be masked so that the coating will only be deposited where necessary. Immersion time determines the amount of coating deposited on the parts. The thickness of the coating can typically vary from 0.0002" to 0.010", although the invention is not limited to a particular coating thickness.

Boron nickel forms an extremely hard coating, with a Knoop hardness of 800 to 900. After heat treating, this hardness may be increased to 1235 to 1245 on the Knoop scale, which converts to approximately 70 to 72 on the Rockwell C Scale. The nodules of the coating have a very strong bond to the substrate, passing ASTM C633. The nodules are bonded to each other through the soft matrix so that when the substrate flexes, the matrix flexes between the nodules. The flexing of the matrix allows the nodules to stay bonded to the coated part and allows the boron nickel coating to be extremely ductile.

The boron nickel coating passes the ASTM B117 accelerated salt spray test for corrosion resistance and also has a very low co-efficient of friction. A part rising against a boron nickel surface will ride on the top of the nodules of the coating. The actual area of contact between two surfaces is less than one half of that for non-coated parts. Boron nickel also has excellent adhesion characteristics and can continually operate at temperatures up to 900° F. and more.

From the foregoing, the advantages of the invention are readily apparent. Through the use of a boron nickel coating on the threads, an electrical path is provided between the coupling members without the necessity of a metallic detent spring with multiple detents. It will be appreciated that although the present invention has been described in detail with respect to a particular type of coupling that is useful for airplane fuel couplings in which the avoidance of static electricity is critical, it is applicable to any type of coupling in which the portions of the coupling that are in contact may be coated with a boron nickel coating to provide electrical conductivity therebetween. For example, many different types of couplings are known, e.g., threaded couplings, quick disconnect couplings, etc., that are constructed of low-friction plastics but that could be constructed of boron nickel coated parts so as to provide electrical conductivity. More generally, although the present invention has been described in detail with respect to certain embodiments and examples, variations and modifications exist that are within the scope of the present invention as defined in the following claims.

I claim:

1. A coupling for providing electrical contact between first and second conduits, the coupling comprising:
    a first coupling member in electrical contact with the first conduit, the first coupling member comprising threads;
    a second coupling member in electrical contact with the second conduit, the second coupling member comprising threads, the first and second coupling members being threadably engageable for establishing a passage conduit between the first and second conduits, at least a portion of the threads of the first and second coupling members that are in physical contact being coated with a boron nickel coating for providing a low coefficient of fiction between the threads and for establishing a strong electrical connection between the first and second coupling members through the threads.

2. The coupling according to claim 1 wherein the first coupling member comprises a first surface facing the second coupling member, the first surface comprising at least one detent notch, the coupling further comprising a detent spring rotatable with and in fixed relation to the second coupling member and facing the first surface, the detent spring comprising a detent, wherein the detent engages in the at least one notch to provide a resistance force against relative rotation between the first and second coupling members as the coupling members threadably engage.

3. The coupling according to claim 2 wherein the detent spring is coated with a dry-lube or is constructed of a non-electrically conducting material.

4. The coupling according to claim 1 wherein the first and second coupling members are entirely coated with the boron nickel coating.

5. The coupling according the claim 1 wherein the first and second coupling members comprise first and second inwardly facing circumferential retaining grooves respectively, the coupling further comprising first and second split rings mounted in the first and second retaining grooves respectively, each split ring being in electrical contact with its respective coupling member, each split ring comprising an internal groove, and first and second bonding wires mounted within the internal grooves of the first and second split rings respectively, each bonding wire being in electrical contact therewith and with its respective conduit.

6. The coupling according to claim 5 wherein each bonding wire is multi-sided and makes electrical contact with its respective conduit at multiple points.

7. The coupling according the claim 1 wherein the first and second coupling members comprise first and second inwardly facing circumferential retaining grooves respectively, the coupling further comprising first and second bonding wires mounted in the first and second retaining grooves respectively, each bonding wire being in electrical contact with its respective coupling member and with its respective conduit.

8. The coupling according to claim 7 wherein each bonding wire makes electrical contact with its respective conduit at multiple points.

9. A coupling for providing electrical contact between first and second conduits, the coupling comprising:
    first and second coupling members in electrical contact with the first and second conduits respectively, the first and second coupling members each comprising threads and being threadably engageable, the threads being coated with a boron nickel coating for providing a low coefficient of friction between the threads and a strong electrical connection between the coupling members through the threads.

10. The coupling according to claim 9 wherein the first coupling member comprises a first surface facing the second coupling member, the first surface comprising at least one detent notch, the coupling further comprising a detent spring rotatable with and in fixed relation to the second coupling member and facing the first surface, the detent spring comprising a detent, wherein the detent engages in the at least one notch to provide a resistance force against relative rotation between the first and second coupling members as the coupling members threadably engage.

11. The coupling according to claim 10 wherein the detent spring is coated with a dry-lube or is constructed of a non-electrically conducting material.

12. The coupling according to claim 9 wherein the first and second coupling members are entirely coated with the boron nickel coating.

13. The coupling according the claim 9 wherein the first and second coupling members comprise first and second inwardly facing circumferential retaining grooves respectively, the coupling further comprising first and second split rings mounted in the first and second retaining grooves respectively, each split ring being in electrical contact with its respective coupling member, each split ring comprising an internal groove, and first and second bonding wires mounted within the internal grooves of the first and second split rings respectively, each bonding wire being in electrical contact therewith and with its respective conduit.

14. The coupling according to claim 13 wherein each bonding wire makes electrical contact with its respective conduit at multiple points.

15. The coupling according to claim 9 wherein the first and second coupling members comprise first and second inwardly facing circumferential grooves respectively, the coupling further comprising first and second bonding wires mounted in the first and second coupling members respectively, each bonding wire being in electrical contact with its respective coupling member and with its respective conduit.

16. The coupling according to claim 15 wherein each bonding wire makes electrical contact with its respective conduit at multiple points.

* * * * *